No. 814,350. PATENTED MAR. 6, 1906.
J. H. BLEOO.
VALVE FOR AIR BRAKE SYSTEMS.
APPLICATION FILED MAY 22, 1903.
4 SHEETS—SHEET 2.
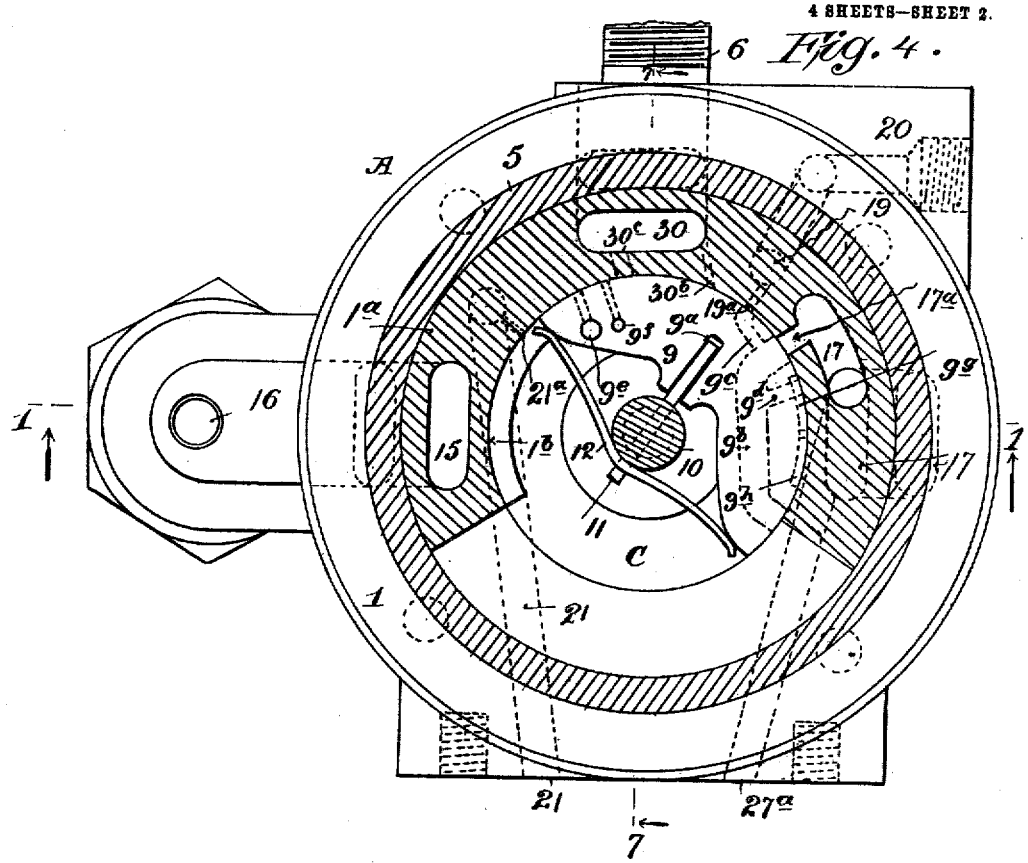
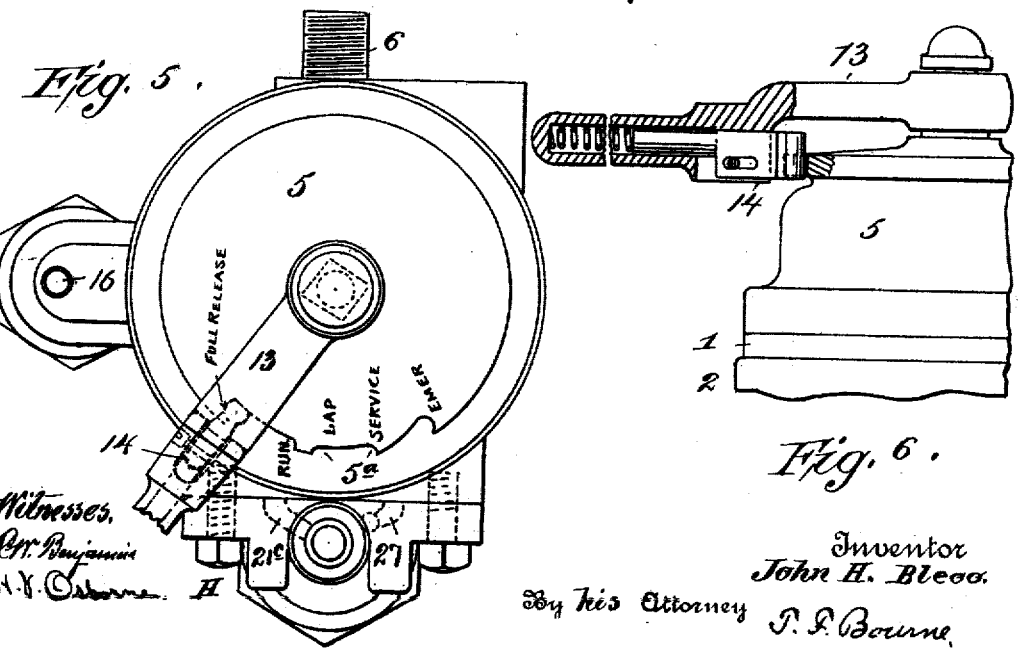
Inventor
John H. Bleoo.
By his Attorney
T. F. Bourne

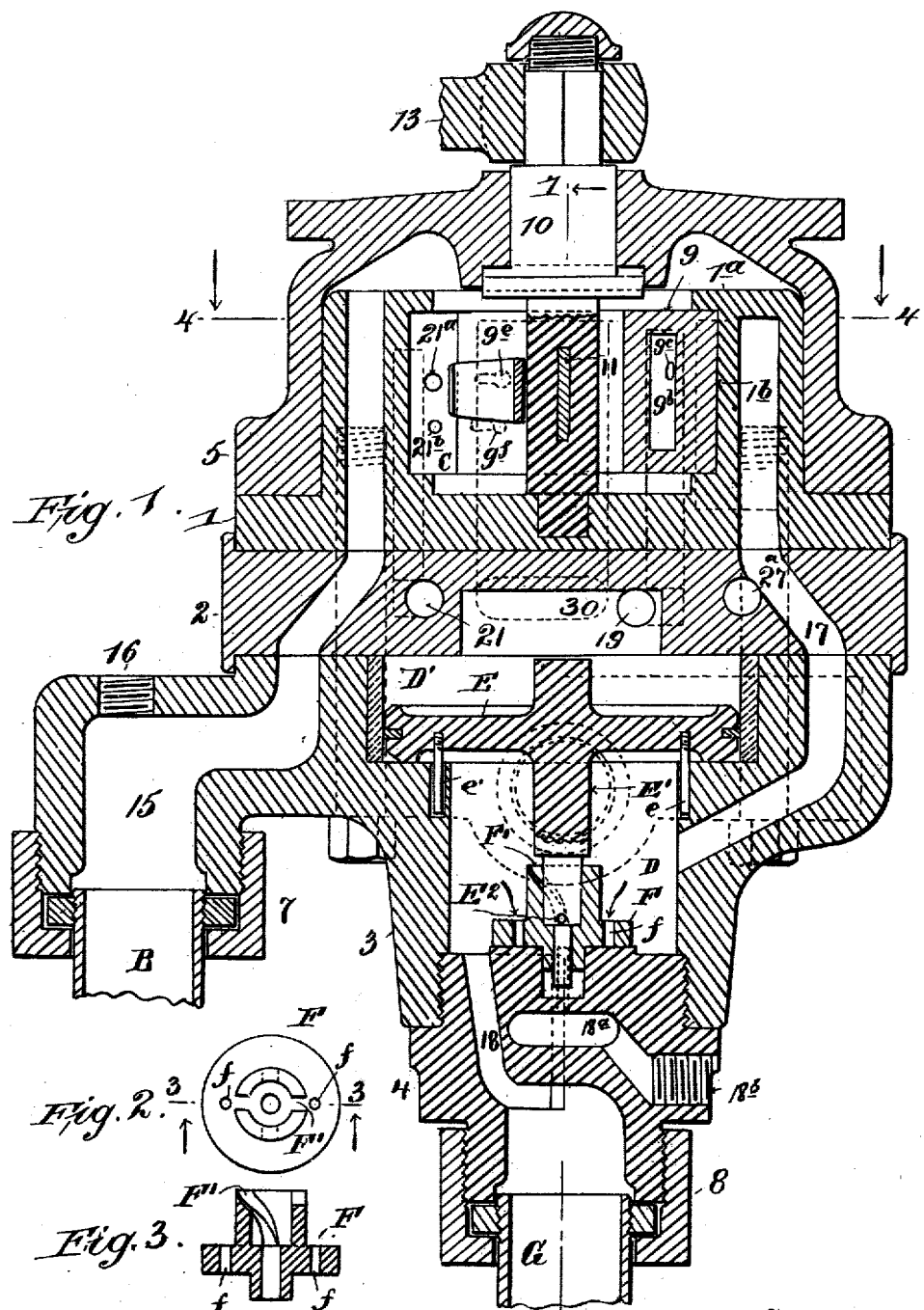

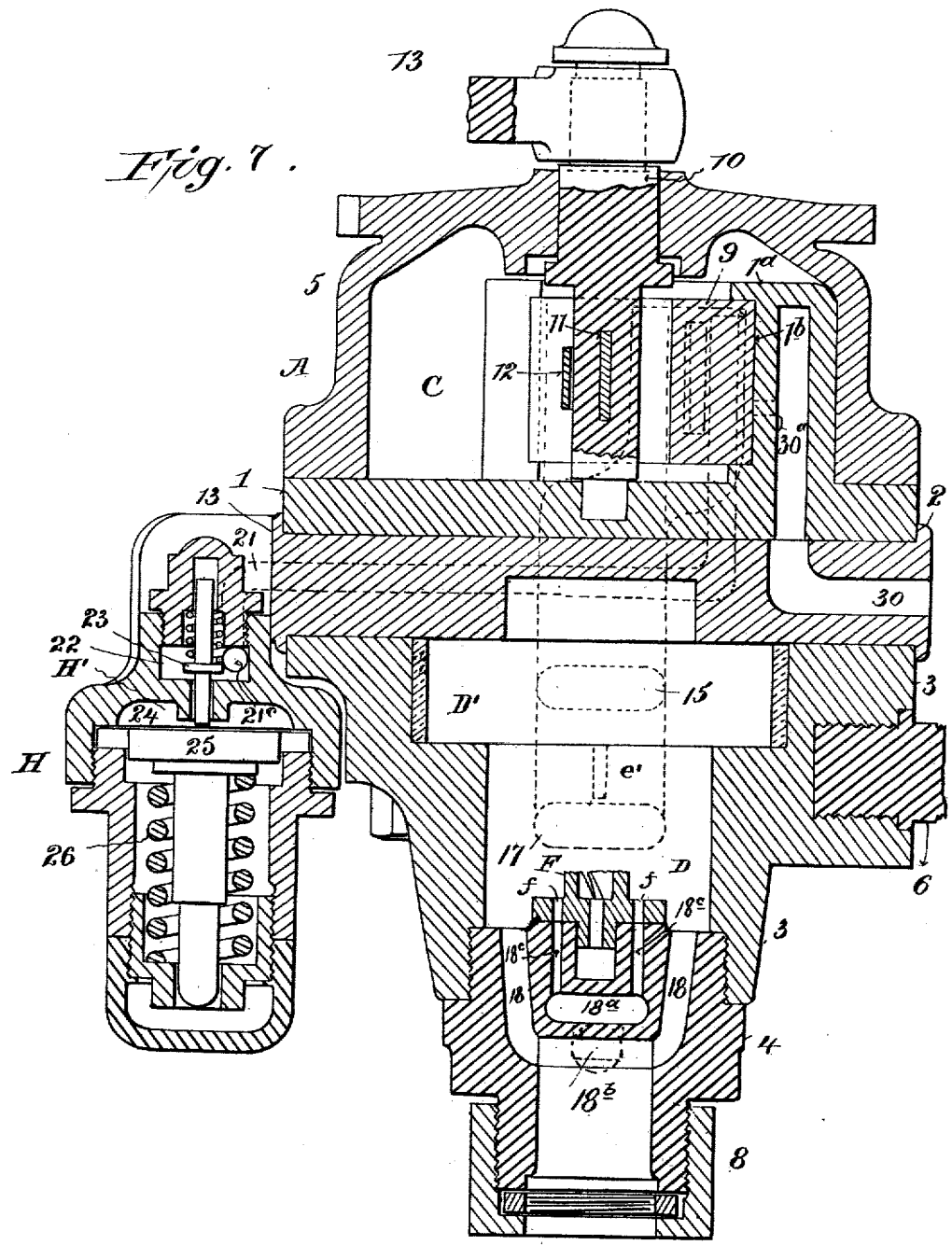

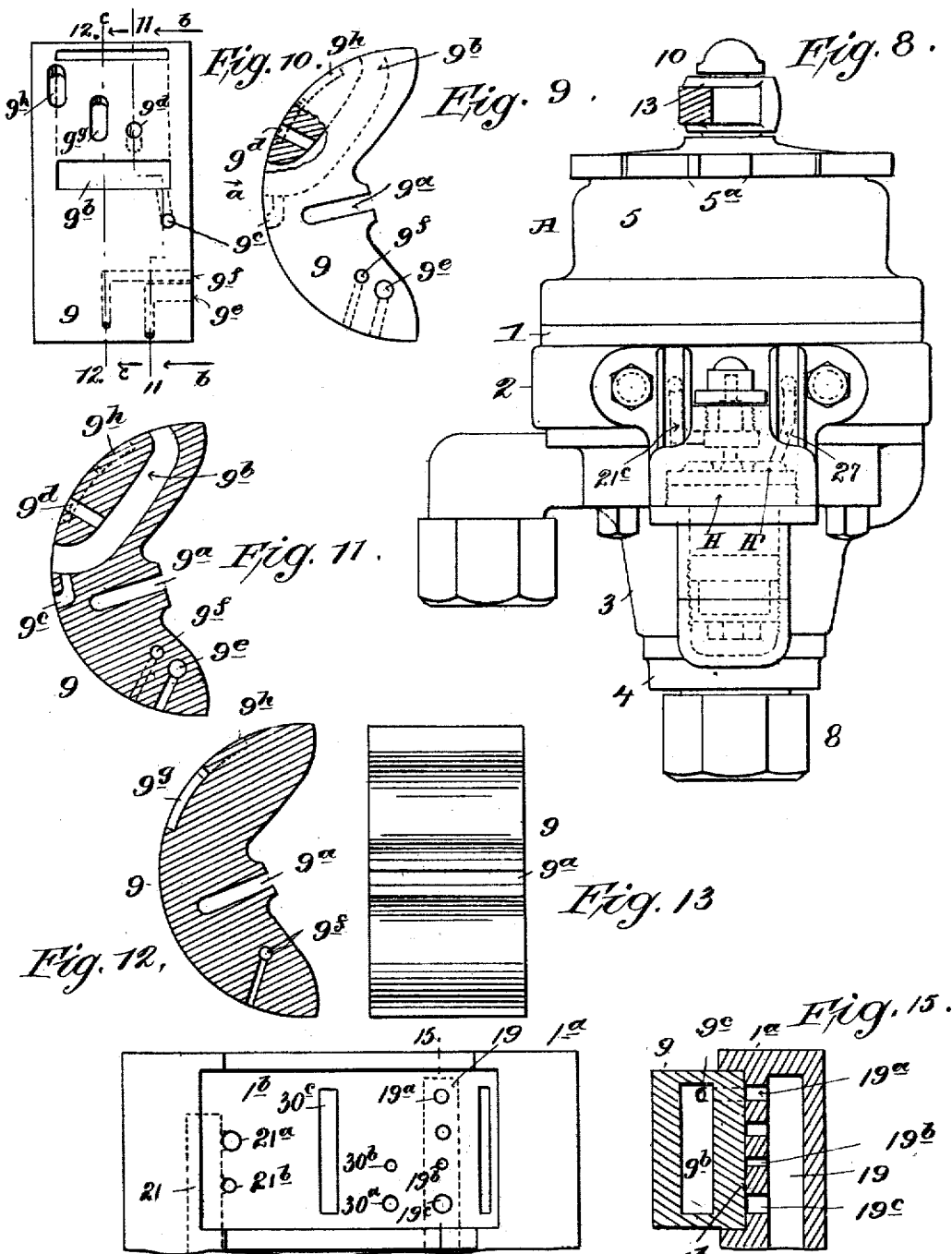

UNITED STATES PATENT OFFICE.

JOHN H. BLEOO, OF NEW YORK, N. Y., ASSIGNOR TO ABRAHAM B. LEVY, OF NEW YORK, N. Y.

VALVE FOR AIR-BRAKE SYSTEMS.

No. 814,350.  Specification of Letters Patent.  Patented March 6, 1906.

Application filed May 22, 1903. Serial No. 158,219.

*To all whom it may concern:*

Be it known that I, JOHN H. BLEOO, of New York city, borough of Brooklyn, county of Kings, and State of New York, have invented certain new and useful Improvements in Valves for Air-Brake Systems, of which the following is a specification.

My invention relates to improvements in air-brake systems or apparatuses, and more particularly to a controlling-valve, commonly called an "engineer's" valve, for controlling the air-brakes on a car or cars used singly or in trains, the valve serving to control the well-known plain and quick-acting triple valves, as well as such valves commonly known as "recharging" triple valves, which embody a device for recharging train-pipe and auxiliary reservoirs while brakes are applied; and the objects of my invention are to provide improvements in the valve portions that control the "service" or reduction of the train-line pressure and also in the valve that controls the air for the various conditions commonly called "running," "service," "full release," "emergency," and "lap."

The invention comprises the novel details of improvement and arrangement of parts, that will be more fully hereinafter set forth and then pointed out in the claims.

Reference is to be had to the accompanying drawings, forming part hereof, wherein—

Figure 1 is a vertical section of an engineer's valve embodying my invention substantially on the line 1 1 in Fig. 4. Fig. 2 is a detail top view of the service-valve shown in Fig. 1. Fig. 3 is a section thereof on the line 3 3 in Fig. 2. Fig. 4 is a horizontal section substantially on the line 4 4 in Fig. 1 looking in the direction of the arrows, the pressure-regulating valve H being omitted. Fig. 5 is a plan view on a reduced scale. Fig. 6 is a detail side view, partly broken away. Fig. 7 is a vertical section at right angles to Fig. 1, substantially on the line 7 7 in Figs. 1 and 4, looking in the direction of the arrows, showing the pressure-regulating valve in position. Fig. 8 is a side elevation of the valve in the position shown in Fig. 1. Fig. 9 is a plan view of the main air-controlling valve, partly broken. Fig. 10 is an edge view thereof looking in the direction of the arrow $a$ in Fig. 9. Fig. 11 is a section on the line 11 11 in Fig. 10 looking in the direction of the arrows $b$. Fig. 12 is a section on the line 12 12 in Fig. 10 looking in the direction of the arrows $c$. Fig. 13 is a side view of the valve looking from the right in Fig. 9. Fig. 14 is a detail face view of the seat for the valve shown in Fig. 9; and Fig. 15 is a section on the line 15 15 in Fig. 14, also showing the valve 9 in section.

In the accompanying drawings similar numerals and letters of reference indicate corresponding parts in the several views.

The main-valve casing is indicated generally at A and for convenience of manufacture is shown comprising main sections or members 1 2 3 4 and a cap or cover 5, and at 6 is indicated a stud for supporting the casing in suitable manner. The members of the casing A are provided with ports, passages, and seats, which may be produced in suitable manner. The member 3 is shown provided with a coupling 7 for connection with a reservoir-pipe B, and at 8 the member 4 is shown provided with a coupling for connection with a train-pipe G, that communicates with auxiliary reservoirs and triple valves of an air-brake system arranged in any well-known manner. The member 1 is provided with a main air-distributing chamber C, inclosed by cap 5, and said member has an upper extension $1^a$ within said chamber provided with a seat $1^b$ for a rotary slide-valve 9, that is contained within chamber C.

At 10 is indicated a stem, shown journaled in the members 1 and 5, and said stem is connected with valve 9 for rotating or sliding the latter, as by means of a tenon 11, engaging a slot $9^a$ in said valve, a spring 12 being shown connected with said stem and bearing against valve 9 to hold the latter normally to its seat $1^b$. (See Fig. 4.)

At 13 is indicated a lever or handle for the engineer to operate and connected with stem 10 for controlling valve 9, a suitable locking device carried by said lever being indicated at 14 for holding the valve in set positions in conjunction with notches at $5^a$ on cap 5. (See Fig. 5.)

Within the casing is located a passage 15, leading from reservoir-pipe B to chamber C for supplying the latter with compressed air or analogous fluid, and at 16 is indicated an opening communicating with passage 15 for connection with a pressure-gage in well-known manner. In the casing A is a passage 17, communicating at the upper part with chamber C at seat $1^b$ and leading to a chamber D, that is in communication with a passage 18, leading to train-pipe G.

In a chamber $D'$ is a piston E, the stem $E'$ of which piston controls a rotary valve F to be used in the service operation. The piston E is shown guided by pins $e$ entering apertures or slots $e'$ in the casing, and the valve F is guided by and adapted to rotate around the stem $E'$. Said valve has one or more ports $f$, that communicate through one or more ports $18^c$ with a passage $18^a$ and its outlet $18^b$, leading from chamber D, for discharging train-pipe air to the atmosphere, as more fully hereinafter explained. The valve F is caused to rotate during the reciprocations of piston E by means of a pin-and-slot connection between stem $E'$ and the valve F. In the arrangement shown a pin $E^2$, carried by stem $E'$, travels in an angular or curved slot $F'$ in valve F, providing at least a quarter-turn, (two such slots $F'$ being shown engaging the opposite ends of pin $E^2$ for equalizing the action.)

The control of the air through the medium of valve 9 is accomplished as follows: The valve 9 has a passage or port $9^b$, which is adapted to communicate through a port $17^a$, leading from seat $1^b$, with passage 17 and with chamber C when valve 9 is in the full-release position, (shown in Fig. 4,) whereby air passes from pipe B, through passage 15, into chamber C, thence through port $9^b$ and passage 17 to chamber D beneath piston E and thence to train-pipe G. Valve 9 also has a port $9^c$ in communication with port $9^b$ and adapted when valve 9 is in said position to communicate with a passage 19, leading by a branch $19^a$ to seat $1^b$, passage 19 also communicating with chamber $D'$ above piston E. (See Fig. 1.) Passage 19 also at 20 leads to an outlet for a well-known equalizing-reservoir. (See Fig. 4.) Air is thus supplied from chamber C through ports $9^b$, $9^c$, and 19 to chamber $D'$ above piston E. A passage 21 communicates at $21^a$ and $21^b$ with valve-seat $1^b$ and leads at $21^c$ to a chamber 22 in a pressure-regulating valve, (indicated generally at H.) In the casing of said valve is a spring-seated check-valve 23, shown in chamber 22, to control the passage to a chamber $H'$ above a diaphragm 24, the stem of which valve rests upon said diaphragm, and beneath said diaphragm is a piston 25, controlled by spring 26 to normally hold the piston against the diaphragm and unseat valve 23. The chamber $H'$ is connected by port 27 and passage $27^a$ with passage 17. When valve 9 is in the position shown in Fig. 4, air passes from chamber C through passage 21 to chamber 22 and thence from chamber $H'$ through 27 $27^a$ to passage 17 and train-pipe G. At this time reservoir-pressure is in the main passages 17 and 19, and thus reservoir-pressure through the system is established. Valve 9 also has a port $9^d$ communicating with port $9^b$ and also a port $9^e$ communicating with chamber C and leading to seat $1^b$, adapted to register with port $21^a$ of the valve-seat leading to passage 21. When the valve 9 is in the running position, port $9^d$ will communicate with port $17^a$, $9^b$ with $19^a$, and port $9^e$ will communicate with port $21^a$, port $9^b$ not being directly in communication with chamber C, and thereupon air will flow as follows: from passage 15 into chamber C, through ports $9^e$ and 21 to and through the pressure-regulating valve-chamber 22, past check-valve 23 into chamber $H'$, Fig. 7, through 27 and $27^a$ to passage 17 to chamber D beneath the piston E, and thence to train-pipe G, and also through passage 17 and its port $17^a$ to ports $9^d$ and $9^b$ of valve 9, and thence from $9^b$ through 19 (with which $9^b$ now registers) to equalizing-chamber $D'$, as well as to the outlet for equalizing-reservoir at 20, until a predetermined pressure is obtained throughout the system, whereupon the diaphragm 24 and piston 25 of the pressure-regulating valve H are forced downward, thereby allowing check-valve 23 to close on its seat, thus cutting off the further flow of air to the train-line. When pressure next falls below that required, the piston 25 and diaphragm 24 are forced upwardly by spring 26, unseating check-valve 23 and restoring pressure through the system. Valve 9 has a port $9^f$ relatively smaller than port $9^e$ for use in the lap position, that is adapted to communicate with port $21^b$ of passage 21, and valve 9 also has a cavity $9^g$, adapted to simultaneously register with a port $19^b$, communicating with passage 19 and with port $17^a$ when valve 9 is in the lap position. In such position of the valve air passes through 15 to chamber C and thence through recharging-port $9^f$ of the rotary slide-valve 9 in less volume than through port $9^e$, through passage 21 to pressure-regulating valve-chamber 22, and past check-valve 23 to chamber $H'$, and through ports 27 and $27^a$ to and through passage 17 and chamber D downward to train-line at G, (valve H now serving as a recharging-valve for the system when recharging triple valves are used,) and also in an upward direction to port $17^a$ at slide-valve seat $1^b$, and through cavity $9^g$ in valve 9, which now registers with both $17^a$ and $19^b$, to passage 19 and thence to equalizing piston-chamber $D'$ and to outlet for equalizing-reservoir at 20, whereby the entire brake system may be recharged with air, while the brakes are applied, without releasing the latter, because such reduced volume of air acts first on the recharging-valve in the triple valve in a system of recharging triple valves. When the brake system has triple valves not having a recharging device, the port $9^f$ in the rotary slide-valve 9 should be closed, as by a screw-plug, whereby in the lap position all ports are then blanked or closed as to the passage of air from chamber C to any part of the system.

In the service position of the parts air is to be discharged from piston-chamber D' and the equalizing-reservoir, and this is accomplished as follows: A relatively large passage 30 communicates with the atmosphere, Fig. 7, and also communicates by a small port 30$^b$ with valve-seat 1$^b$, and when valve 9 is in service position cavity 9$^g$ connects port 30$^b$ with port 19$^b$, and then air from chamber D' and the equalizing-reservoir passes from passage 19 to and through cavity 9$^g$ and port 30$^b$ to passage 30 and thence to the atmosphere. The pressure thereupon is reduced in chamber D', and piston E is forced upwardly by train-pipe pressure in chamber D. Said piston in its upward travel turns the rotary valve F, bringing its port or ports $f$ in register with the ports 18$^c$, discharging train-pipe air through 18$^a$ and 18$^b$ to the atmosphere, and thus by a slow reduction in train-pipe pressure the brakes are applied smoothly. As piston E cannot revolve owing to its guides $e$, the valve F is caused to turn on its seat and is held on its seat by pressure in chamber D. To now hold the brakes applied, it is merely necessary to move the handle 13 to the lap position, whereupon valve 9 will close port 30$^b$ and bring port 9$^f$ of said valve in register with port 21$^b$, admitting air from chamber C to the pressure-regulating valve H and thence to piston-chamber D' and to equalizing-reservoir through 20, (should same be used,) thereupon causing the pressure in said chamber D' and reservoir to rise above train-line pressure, and thus forcing piston E downward slowly, thereby turning rotary valve F to close port 18$^c$ to the atmosphere, and thus permitting recharging of the train-pipe and system while brakes are set.

For an emergency application of the brakes the arrangement and operation are as follows: The valve 9 has a cavity 9$^h$, adapted to simultaneously register with port 19$^c$ of passage 19 and the port 30$^a$, leading to passage 30, (see Fig. 14,) when valve 9 is turned to the emergency position. In such position the large port 9$^b$ of valve 9 at its lower end in Fig. 4 will register with port 17$^a$ and its opposite end with a large port 30$^c$, leading to passage 30 and the atmosphere, and passage 19 through cavity 9$^h$ will be in communication with 30 through small port 30$^a$ to atmosphere, whereupon a violent reduction of air-pressure direct from the train-pipe G to the atmosphere will be produced and brakes will be set quickly and with great force. To release the brakes, handle 13 will be moved to full-release position, which will admit reservoir-pressure straight to the train-line.

Having now described my invention, what I claim is—

1. The combination of a casing having chambers and inlet and outlet passages and ports communicating therewith, with a piston in one chamber, a rotative valve adapted to control an outlet, and means connecting the piston with said valve for rotating the latter by the movements of said piston, substantially as described.

2. The combination of a casing having chambers and inlet and outlet passages and ports communicating therewith, with a piston in one chamber, a valve to control an outlet, and a pin-and-slot connection between the piston and said valve, substantially as described.

3. The combination of a casing having chambers and inlet and outlet passages and ports communicating therewith, with a piston in one chamber, a valve to control an outlet, a pin-and-slot connection between the piston and said valve, and means to prevent rotation of said piston, substantially as described.

4. The combination of a casing having chambers and inlet and outlet passages and ports communicating therewith, with a piston, means to prevent rotation of the piston, a rotative valve having a port to register with an outlet-port, and means connecting the piston with said valve for rotating the latter during the reciprocations of the piston, substantially as described.

5. The combination of a casing having chambers and inlet and outlet passages and ports communicating therewith, with a piston provided with a stem, a valve journaled on said stem and arranged to control an outlet-port, and means connecting the piston with the valve for rotating the latter during the reciprocations of the piston, substantially as described.

6. The combination of a casing having chambers, a piston between said chambers, said casing having air-supply passages communicating with said chambers, means to maintain equal pressure in said chambers on opposite sides of the piston, means to reduce the pressure in one chamber on one side of the piston, a rotative valve adapted to control an outlet-port communicating with the other chamber, and means connecting said piston with said valve for rotating the latter, whereby on reduction of air-pressure on one side of the piston the latter will move to cause said valve to turn to open the outlet-port, substantially as described.

7. The combination of a casing having chambers and air-supply passages and ports communicating therewith, a piston between said chambers, a valve to control the admission of air simultaneously through said passages and ports, said casing having an exhaust-passage, said valve being provided with means for placing one of said ports in communication with said exhaust-passage to cause a reduction of air-pressure on one side of the piston, a rotative valve arranged to control an outlet-port communicating with one chamber, and means connecting said piston with said valve for causing the latter to turn to permit a reduction of air-pressure on the other side of said piston, substantially as described.

8. The combination of a casing having an air-supply chamber and pressure-regulating chambers, a piston between the last-named chambers, a rotary valve to control an outlet from one of said chambers, means to cause the piston to turn said valve, said casing having a passage leading to the air-supply chamber and passages connecting the air-supply chamber with the pressure-chambers on opposite sides of the piston, a pressure-regulating valve, said casing having a passage connecting said valve with the first-named chamber and a passage connecting said valve with the passage leading to the pressure-chamber on the train-pipe side of the piston, and a valve in the first-named chamber having ports and passages adapted to control the ports connected with said chamber, substantially as described.

9. The combination of a casing having an air-supply chamber, a pressure-regulating valve connected by a passage with said chamber, said casing having chambers D and D', a piston between said chambers, passages connecting said air-supply chamber with said chambers D and D', a passage providing communication between said valve and chamber D, and a valve to control the passages leading from the air-supply chamber, said valve having means to cause a reduction of pressure in the chamber D' as required, said valve also having means to admit air from the air-supply chamber to the regulating-valve for recharging the system in the customary "lap" position, substantially as described.

10. The combination of a casing provided with an air-supply chamber, a chamber D for connection with a train-pipe and provided with an outlet, a passage connecting said chambers, the casing having a chamber D', a piston between the chambers D and D', a valve operated by said piston to control the outlet from chamber D, the casing having a passage connecting the chamber D' with the air-supply chamber, a pressure-regulating valve having a chamber connected by a passage with the air-supply chamber and another chamber connected by a passage with the passage leading to chamber D, and a slide-valve in the air-supply chamber provided with means to direct air in the "running" position to the first-named valve which then serves as a pressure-reducing valve for the system, the slide-valve also having means to cause air to escape in the "service" position, and having means to cause air to pass through the pressure-regulating valve in the customary "lap" position to cause said pressure-regulating valve to act as a recharging-valve for the system, substantially as described.

11. The combination of a casing having an air-supply chamber, a pressure-regulating valve connected by a passage with said chamber, said casing having chambers D and D', a piston between said chambers, passages connecting said air-supply chamber with said chambers D and D', a passage providing communication between said valve and chamber D, and a valve to control the passages leading from the air-supply chamber, said valve having means to cause a reduction of pressure in the chamber D' as required, said valve also having means to admit air from the air-supply chamber to the train-pipe while the other passages controlled by said valve are blanked and the brakes are applied, substantially as described.

12. The combination of a casing having an air-supply chamber, a pressure-regulating valve connected by a passage with said chamber, said casing having chambers D and D', a piston between said chambers, passages connecting said air-supply chamber with said chambers D and D', a passage providing communication between said valve and chamber D, and a valve to control the passages leading from the air-supply chamber, said valve having means to cause a reduction of pressure in the chamber D' as required, said valve also having a port to coact with a port and passage in the casing to supply air to the train-pipe while the other passages controlled by said valve are blanked and the brakes applied, substantially as described.

13. The combination of a casing having an air-supply chamber, a pressure-regulating valve connected by a passage with said chamber, said casing having chambers D and D', a piston between said chambers, passages connecting said air-supply chamber with said chambers D and D', a passage providing communication between said valve and chamber D, and a valve to control the passages leading from the air-supply chamber, said valve having means to cause a reduction of pressure in the chamber D' as required, said valve also having means to admit air from the air-supply chamber to the regulating-valve for recharging the system through said regulating-valve while the other passages controlled by said valve are blanked and the brakes are applied, substantially as described.

14. The combination of a casing having an air-supply chamber, a pressure-regulating valve connected by a passage with said chamber, said casing having chambers D and D', a piston between said chambers, passages connecting said air-supply chamber with said chambers D and D', a passage providing communication between said valve and chamber D, and a valve to control the passages leading from the air-supply chamber, said valve having means to cause a reduction of pressure in the chamber D' as required, said valve also having a port to coact with a port and passage in the casing communicating with said regulating-valve to supply air through said regulating-valve to the system to recharge the system while the other ports controlled by the valve are blanked and the brakes are applied, substantially as described.

15. The combination of a casing provided with an air-supply chamber, a chamber D for connection with a train-pipe and provided with an outlet, a passage connecting said chambers, the casing having a chamber D', a piston between the chambers D and D', a valve operated by said piston to control the outlet from chamber D, the casing having a passage connecting the chamber D' with the air-supply chamber, a pressure-regulating valve having a chamber connected by a passage with the air-supply chamber and another chamber connected by a passage with the passage leading to chamber D, and a slide-valve in the air-supply chamber provided with means to direct air in the "running" position to the first-named valve which then serves as a pressure-reducing valve for the system, the slide-valve also having means to cause air to escape in the "service" position, and having means to cause air to pass to the train-pipe while the other passages controlled by said slide-valve are blanked and the brakes are applied, substantially as described.

16. The combination of a casing provided with an air-supply chamber, a chamber D for connection with a train-pipe and provided with an outlet, a passage connecting said chambers, the casing having a chamber D', a piston between the chambers D and D', a valve operated by said piston to control the outlet from chamber D, the casing having a passage connecting the chamber D' with the air-supply chamber, a pressure-regulating valve having a chamber connected by a passage with the air-supply chamber, and another chamber connected by a passage with the passage leading to chamber D, and a slide-valve in the air-supply chamber provided with means to direct air in the "running" position to the first-named valve which then serves as a pressure-reducing valve for the system, the slide-valve also having means to cause air to escape in the "service" position, and having a port to coact with a port and passage in the casing to supply air to the train-pipe while the other passages controlled by said valve are blanked and the brakes are applied, substantially as described.

17. The combination of a casing provided with an air-supply chamber, a chamber D for connection with a train-pipe and provided with an outlet, a passage connecting said chambers, the casing having a chamber D', a piston between the chambers D and D', a valve operated by said piston to control the outlet from chamber D, the casing having a passage connecting the chamber D' with the air-supply chamber, a pressure-regulating valve having a chamber connected by a passage with the air-supply chamber and another chamber connected by a passage with the passage leading to chamber D, and a slide-valve in the air-supply chamber provided with means to direct air in the "running" position to the first-named valve which then serves as a pressure-reducing valve for the system, the slide-valve also having means to cause air to escape in the "service" position, and having means to cause air to pass through the pressure-regulating valve while the other passages controlled by the slide-valve are blanked and the brakes are applied, substantially as described.

18. The combination of a casing provided with an air-supply chamber, a chamber D for connection with a train-pipe and provided with an outlet, a passage connecting said chambers, the casing having a chamber D', a piston between the chambers D and D', a valve operated by said piston to control the outlet from chamber D, the casing having a passage connecting the chamber D' with the air-supply chamber, a pressure-regulating valve having a chamber connected by a passage with the air-supply chamber and another chamber connected by a passage leading to chamber D, and a slide-valve in the air-supply chamber provided with means to direct air in the "running" position to the first-named valve which then serves as a pressure-reducing valve for the system, the slide-valve also having means to cause air to escape in the "service" position, and having a port to coact with a port and passage in the casing communicating with said regulating-valve to supply air through said regulating-valve to the system to recharge the system while the other ports controlled by the valve are blanked and the brakes are applied, substantially as described.

JOHN H. BLEOO.

Witnesses:
  HENRY STOREK,
  T. F. BOURNE.